Figure 2:
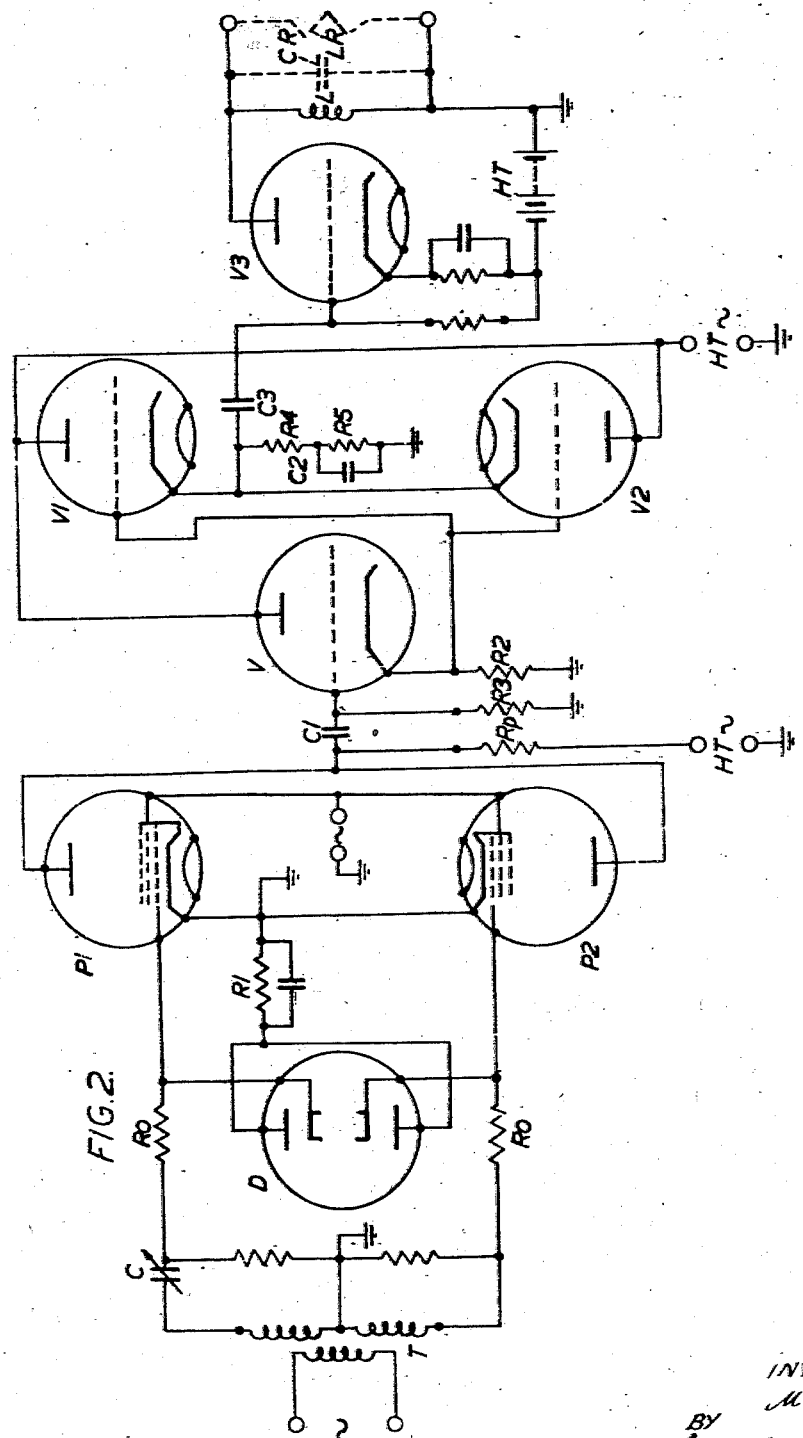

Dec. 30, 1947.   M. M. LEVY   2,433,378
ELECTRICAL OSCILLATION GENERATOR
Filed Sept. 11, 1942   3 Sheets-Sheet 1
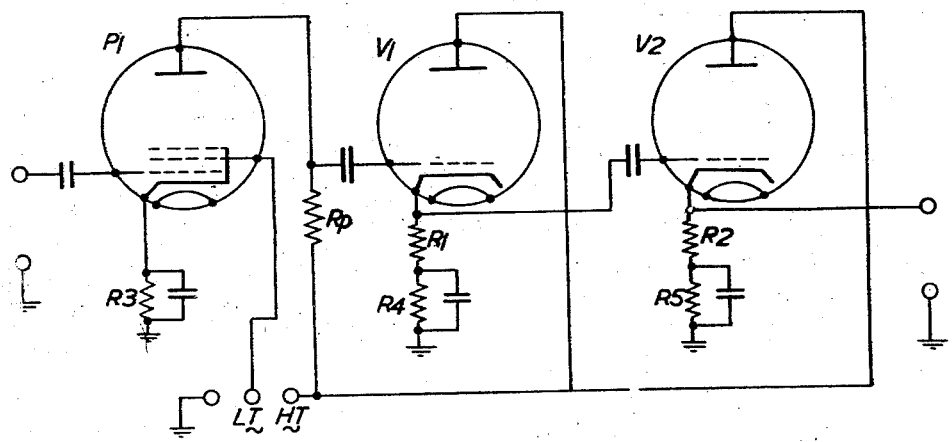
FIG. 1.
FIG. 4.
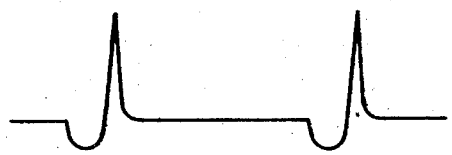
INVENTOR
M. M. Levy
BY
Loyd Hall Sutton
ATTORNEY

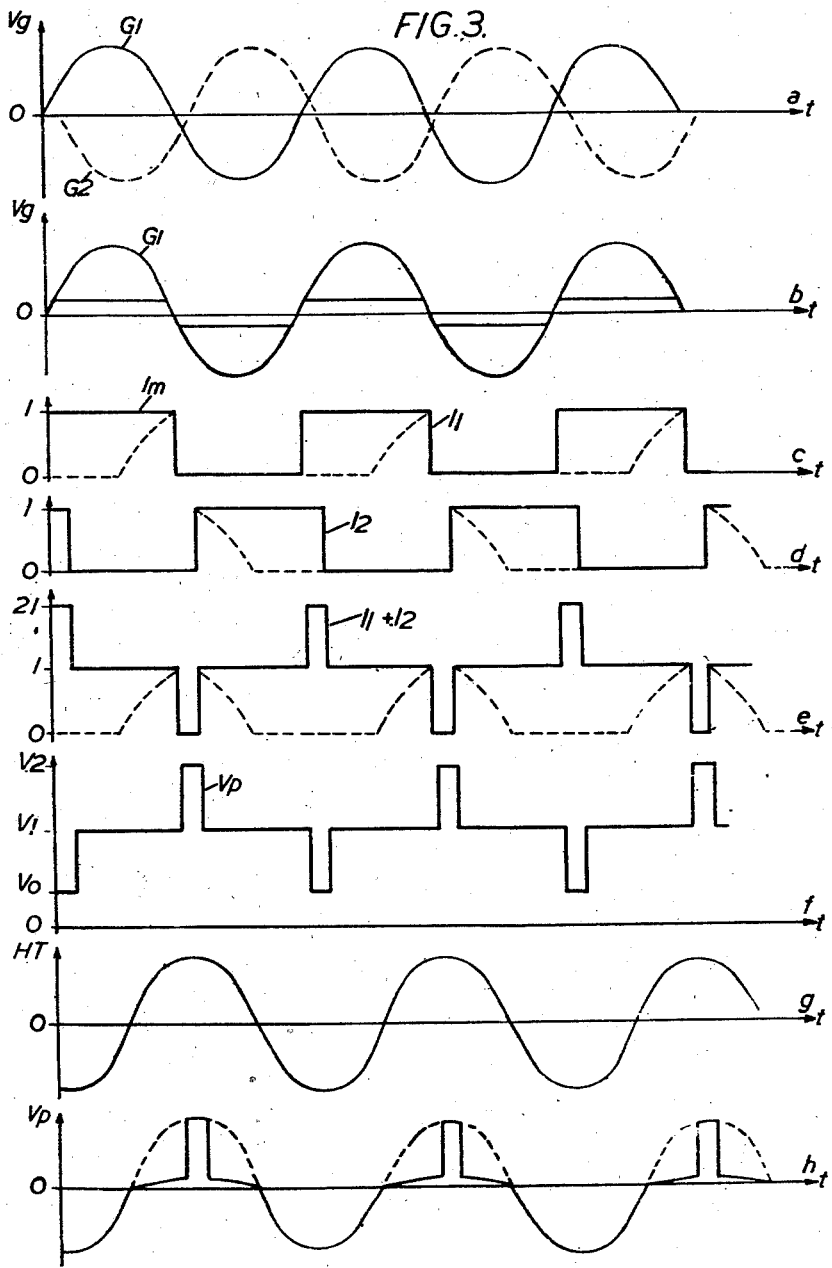

Patented Dec. 30, 1947

2,433,378

UNITED STATES PATENT OFFICE 2,433,378

ELECTRICAL OSCILLATION GENERATOR

Maurice Moïse Lévy, London W. C. 2, England, assignor to Standard Telephones and Cables Limited, London, England, a British company Application September 11, 1942, Serial No. 458,062
In Great Britain March 21, 1941

Section 1, Public Law 690, August 8, 1946
Patent expires March 21, 1961

4 Claims. (Cl. 250—27)

This invention relates to arrangements for amplifying and generating electrical impulses of very short duration.

Signalling by impulse transmission or the use of impulses for obstacle detection, the determination of height etc., renders it possible to concentrate a greater energy in each impulse than in the case of continuously transmitted waves. The shorter the duration of the impulses in relation to the period of repetition the greater may be the concentration of energy. If, for example, each impulse has a duration of a hundredth part of the period of repetition the instantaneous power which can be dissipated by an impulse amplifying or generating valve during the impulse is one hundred times greater than the instantaneous power which the same valve can dissipate during continuous transmission.

In order to obtain a very high instantaneous emission, the plate voltage is increased during the impulse transmission which simultaneously increases the plate current. The power thus increases in accordance with a more rapid law than that of the voltage.

An important problem in the design of impulse transmitters, therefore, lies in the production of very high peak voltages during a very short period, together with high power outputs.

In one of the methods most frequently adopted, a high inductance is connected to the plate of a valve the grid of which is fed with rectangular impulses. At each impulse the plate current increases rapidly and attains a peak value which is then sharply cut off. The energy which has accumulated in the inductance is then discharged in the circuit formed by the residual capacity and if the circuit is correctly designed, aperiodic impulses of very high voltage and peak power may be obtained. A pentode of normal rating of 1 kw. will, for example, give peak voltages of 20,000 to 30,000 volts and peak currents of 15 amperes for impulses having a duration of 10 microseconds. This gives a peak power of 300 to 450 kw. In order, however, to obtain these high outputs and peak voltages it is necessary that the grid should be made very positive during the impulse transmission. On the other hand, the grid should drop to very high negative voltages in order that the cut-off may be obtained.

The problem, therefore, arises that a source of rectangular impulses has to be produced which produces impulses with very steep edges at high voltages and which presents a low impedance.

It has been the practice in the past to use a low-power rectangular impulse generator and to amplify these impulses by a series of valves connected in cascade. It has, however, been necessary to use in such arrangements power amplifier stages having a large current output which is only actually required during a small fraction of the time. Hence, there is a great wastage of power.

An object of the present invention is the provision of an amplifying arrangement for converting impulses of relatively low voltage and low power into impulses of high voltage and high power developed in a circuit of low impedance, by using a multi-stage amplifier, the first stage of which is designed to amplify the voltage of the impulses, and the second and subsequent stages are designed to amplify their power, the voltage remaining practically the same. Each stage comprises a thermionic valve or valves which are preferably operated at many times their normal power during the transmission of an impulse, and which at the same time may with advantage be arranged to consume only a small amount of power in the intervals between the impulses. According to a preferred arrangement, also, the valves may be connected as cathode followers. In addition, increased power economy may be obtained by supplying the plate circuits of the valves with alternating potential instead of constant potential.

A further object of the invention is the provision of an arrangement for generating rectangular impulses, using low power capacity valves in such manner as to produce impulses having a peak power many times the power handling capacity of the valves.

According to the invention, a system for producing rectangular impulses of short duration from a source of sinusoidal waves comprises a thermionic valve circuit for converting the sinusoidal waves into rectangular impulses of high voltage and lower power and means for applying these impulses to one or more thermionic valve amplifier stages which are designed to operate as a power amplifier and which contribute substantially no voltage amplification. In a preferred arrangement the power amplifier comprises one or more stages of the so-called cathode follower type.

These and other minor features of the invention will be more fully understood from a consideration of the following detailed description and the accompanying drawings in which Figs. 1 and 2 are circuit diagrams of two embodiments of the invention, and Figs. 3 and 4 are wave form diagrams referred to in the description.

Referring to Fig. 1, $P_1$ is a pentode preferably of low power. $V_1$ and $V_2$ are amplifying valves with any number of electrodes, but are shown as triodes for simplicity. The valves may be of the type having indirectly heated cathodes as shown; the heating circuits have been omitted for clearness. $P_1$ is arranged as an ordinary amplifier while the valves $V_1$ and $V_2$ are connected as cathode followers.

If a negative impulse be applied to the grid of valve $P_1$, a positive impulse will appear at the terminals of the plate resistance $R_p$. This impulse is transmitted to the grid of the following valve $V_1$. The valve $V_1$ produces at the terminals of the cathode resistance $R_1$ an impulse having substantially the same amplitude as that applied to the grid. Moreover, as the cathode resistance $R_1$ can be much smaller than the preceding plate resistance $R_p$, the peak power of the impulses produced by valve $V_1$ can be much greater than the peak power of the impulses produced by the preceding valve $P_1$. The power of the impulses is again amplified in the same way by connecting the grid of valve $V_2$ to the cathode of $V_1$; and by making the cathode resistance $R_2$ of valve $V_2$ much smaller than $R_1$ the peak power of the impulses can be again increased while not appreciably changing the voltage. Clearly the process can be repeated as often as desired. With two power amplifying valves as shown in Fig. 1 it is possible to increase the peak power of the impulse 50 times or more.

In order to obtain a high power efficiency, the valve $P_1$ should preferably be a pentode having a high slope: the various grids will then all be close to the cathode, while the plate will be much further away. It is possible, therefore, to apply very high voltages to the plate without affecting the field near the cathode. Accordingly the emitting surface will not be in danger of deterioration due to violent abstraction of the electrons therefrom or to bombardment by positive ions.

Since the incoming impulse is arranged to apply negative potential to the grid, the plate current during the impulse can be made practically zero. Thus the plate voltage can be very high without dissipating very much power in the valve. During the rest of the time, however, plate current will flow, but the power dissipation can then be limited by making the plate resistance $R_p$ sufficiently large to reduce the plate voltage to a low value.

In the power amplifying stages, valves are used in which the normal power dissipated is of the same order as the mean power dissipated by the plate current while the impulses are being transmitted. Thus, since they last a very short time, the peak power dissipated by the plate current during any one impulse can be many times this mean power. For example, if the impulses occupy 1% of the time, the instantaneous power dissipated by the valve during the transmission of any impulse can be 100 times its mean power.

In order to obtain high voltage impulses, a potential much higher than the normal is applied to the plate, which can be done without danger to the valve for the following reasons. The valve only delivers any power during the periods of the impulses, and the cathode potential rises in these periods. It is so arranged that the plate-cathode potential difference does not rise above the maximum allowable value during the periods of the impulses. Further, the valves are operated in the region of grid current at a point on the characteristic such that the instantaneous cathode current will be much greater, for example 100 times greater, than normal. To do this the invention contemplates the use of valves which have a high space charge, or an emitting surface which practically does not saturate, or both combined. For example, oxide coated cathodes practically do not saturate.

The plate circuits of all the valves may be fed with alternating potential when the impulses are regularly repeated. The frequency of the alternating potential should be the same as that of the impulses or a harmonic thereof, and the potential applied to each plate must be arranged to be a maximum at the moment of the impulses.

This has a particular advantage when applied to the first valve. It greatly increases the power efficiency of the arrangement by applying the maximum plate potential only at the moments of the impulses. The potential at other times is lower or negative and so the power dissipation in the valves is reduced. The process is explained in detail in connection with Fig. 2 below.

In Fig. 1, resistances $R_4$ and $R_5$, shunted by condensers, are shown connected in the cathode circuits of $V_1$ and $V_2$. These are chosen to be of such values that the plate currents of the valves are reduced to very low values during the periods between impulses in order that the power consumption of the valves in these periods may be small. With a circuit like Fig. 1, it is possible to produce impulses of peak voltage of the order of 1000 volts in an impedance of 500 ohms (that is, having a peak power of 2 kilowatts) from impulses having peak voltage of a few volts, using valves rated at not more than 25 watts.

Fig. 2 shows the circuit of a sinusoidal impulse generator in which the special features described in relation to Fig. 1 are incorporated. According to this arrangement alternating current having a frequency equal to the frequency of impulse repetition feeds the primary winding of a transformer T. The secondary windings feed the grids of two pentodes $P_1$, $P_2$, and are connected so as to supply the grids with voltages which are in phase opposition. A small condenser C, however, permits the voltages to be displaced slightly in phase from exact phase opposition.

The secondary windings of transformer T supply very high voltages, 1000 volts, for example, so that the valves $P_1$, $P_2$ are saturated very suddenly but each voltage is transmitted to the grid through the medium of a very high resistance $R_0$, which limits the positive voltage applied to the grid. The negative voltages are also limited by a diode D which connects the grid to earth or other point of stable potential, the cathode of the diode being connected to the grid of the pentode and the plate of the diode to earth over a biasing resistance $R_1$. The plates of the two pentodes are connected together and are fed from a very high tension source (from 1000 to some thousands of volts), through a resistance $R_p$.

The pentodes $P_1$, $P_2$ are preferably low power tubes operated at abnormally high plate voltages. As previously explained, therefore, it is desirable to employ high slope pentodes in which the three grids are located close to the cathode and the plate is relatively a considerable distance from the cathode.

The operation of the portion of the circuit so far described will now be explained with reference to the wave-form diagrams of Fig. 3.

In Fig. 3a is shown the two sinusoidal waves transmitted to the grid circuits. These waves are very slightly displaced with respect to each other in relation to phase opposition.

One of the waves is shown in light line in Fig. 3b. As its amplitude is very high, a small fraction only is actually transmitted to the grid, the remainder appearing at the terminals of the resistance $R_0$ in the form of a drop in potential alternately produced by the grid current and the diode current. The wave actually transmitted to the grid is shown by the heavy line in Fig. 3b and takes the form of a series of practically rectangular trapeziums, the slopes of the sides of which will be very steep if the amplitude of the wave is sufficiently great.

The plate currents $I_1$ and $I_2$ of the two pentodes take the form of rectangles as shown in Fig. 3c and 3d respectively, in the thick continuous lines. These rectangles are in phase opposition with a slight angular displacement. The resulting current which circulates in common resistance $R_p$ takes the form shown by the continuous lines in Fig. 3e, and is obtained by adding together the ordinates of the two curves of Figs. 3c and 3d. It will be seen that the resultant current is in the form of positive and negative impulses.

The plate voltage has the inverse form of the resultant current. It is a maximum when the current is zero and a minimum when the current is a maximum as indicated in Fig. 3f. If, for example, the potential applied to the assistance $R_p$ is 2000 volts the amplitude of the impulses can be (say) 1500 volts if the value of the resistance $R_p$ has been made sufficiently high, account being also taken of the grid current of the following valve V which is not negligible.

If the valves used in the type of circuit just described are operated in the conventional manner, the resistance $R_p$ will need to be very high in order that the fall of the potential therein due to the plate current may be sufficient to produce the desired amplitude of the impulse. Moreover, since the plate voltage during the intervals between the signals (that is for perhaps 99% of the time) is, in the example just chosen, about 1000 volts, the valves will be dissipating considerable power nearly all the time. This will clearly prevent the use of low power valves operated with abnormally high plate voltages which would be otherwise desirable. If, however, alternating potential be applied to the resistance $R_p$ instead of a constant potential these objections can be largely overcome, because by this means the power consumption in the periods between the impulses can be very considerably reduced, as will now be explained.

The alternating voltage applied to the plate resistance $R_p$ is shown in Fig. 3g. As shown, it should be in phase quadrature with the voltages applied to the grids $P_1$ and $P_2$, and it should be a positive maximum when the resultant plate current, as shown in Fig. 3e, is zero. In Figs. 3c and 3d the dotted lines show the plate currents of the valves $P_1$ and $P_2$ respectively, when the alternating voltage of Fig. 3g is applied to resistance $R_p$ instead of the constant voltage. The peak voltage of the valve of Fig. 3g is equal to that constant voltage, and since the peaks occur at the same times as the impulses, the currents $I_1$ and $I_2$ will have approximately the same values at these times as when constant voltage was used. Since the alternating voltage falls to zero at times halfway between the impulses, the plate currents $I_1$ and $I_2$ must also both fall to zero at these same times and must accordingly follow the dotted curves in Figs. 3c and 3d. During the alternate half periods when the applied alternating voltage is negative, the plate current will be zero. Thus the total plate current $I_p = I_1 + I_2$ flowing through $R_p$ will take the form shown by the dotted lines of Fig. 3e, obtained by adding the ordinates of the dotted lines in Figs. 3c and 3d. The negative impulses at the intermediate half periods disappear because the plate voltage is then negative. The total plate current is accordingly zero for the period of the positive impulses and for the whole of the periods during which the applied alternating voltage is negative.

The plate voltage is shown in Fig. 3h in which the dotted line shows the applied alternating potential. It is negative or a maximum when the total plate current is zero and may be made to have a very low value as indicated in Fig. 3h during the periods when any current flows, by making the resistance $R_p$ great enough.

By referring to Figs. 3c and 3d it will be seen that when the valves are operated with alternating plate potential, the plate current of each valve as shown by the dotted lines, is zero except during one quarter of the period of the wave of Fig. 3g. Further, the plate current during this quarter period is not constant, but varies continuously from the maximum $I_M$ to zero. The average current over this period can accordingly be taken as very approximately equal to $I_M/\sqrt{2}$. Thus the average plate current over a whole period of the alternating potential will be approximately $I_M/4\sqrt{2}$, or about $I_M/6$. Thus if $I_M$ is the maximum allowable plate current for continuous dissipation with the normal constant applied potential, a plate current of 6 $I_M$ will be permissible with alternating applied potential. This means that to produce the desired drop of potential when the impulse is received, the resistance $R_p$ may be reduced to one sixth of the value necessary with constant applied plate potential.

The resistance $R_p$ is preferably adjusted as already mentioned, so that with alternating plate potential the plate voltage during the times when any plate current flows will be much lower than the normal plate voltage of the valve. This will enable the plate current for the same average power dissipation to be much higher. For instance, this current can at least be doubled, making 12 $I_M$. When operating with continuous applied plate potential the maximum allowable plate current would be only 2 $I_M$, because as shown in Figs. 3c and 3d (continuous lines), the plate current in each valve is zero during half of each period.

The advantage obtained by the use of alternating potential is best illustrated by an example. A valve normally operated with 300 volts continuous plate potential and 50 milliamps plate current may be operated with alternating plate potential of 2000 volts amplitude, and with 300 milliamps instantaneous plate current. In the first case the value of $R_p$ should be about $300/50 \times 10^3$ ohms = 6000 ohms, and the second case $R_p$ should be about $2000/300 \times 10^3$ ohms = 6667 ohms. In other words by the use of alternating potential the peak voltage of the impulses has been increased from 300 volts to 2000 volts, and the peak power has been increased nearly 50 times while the plate resistance $R_p$ remains practically the same.

It is also advisable that the feed to the screening grids should also be alternating. The voltage applied to the screening grids should be in phase with the voltage applied to the plate circuit. The amplitude of the voltage applied to the screening grids should, however, be of the same order of magnitude as the normal voltage with continuous current operation.

The circuit previously described supplies impulses of adequate voltage, but from a high impedance. The object of the power amplifier stage is to obtain increased power by producing the same voltages from much lower impedances.

This is achieved by the use of one or more valves connected as cathode-followers in a manner similar to that already described in reference to Fig. 1. The impulses are applied to the grid of the valve V over condenser $C_1$ and the output voltage is taken from a resistance $R_2$ inserted between the cathode and earth. $R_3$ is a grid circuit resistance. A voltage approximately equal to that on the grid appears at the cathode, and as already explained the resistance $R_2$ in the cathode lead may be much smaller than the resistance $R_p$ at whose terminals the impulses are supplied.

If it is desired to obtain even lower output impedances, it is possible to follow this stage (as shown) by another cathode follower stage using two valves $V_1$, $V_2$ connected in parallel. The output is taken from resistances $R_4$, $R_5$ in the cathode lead. Resistance $R_5$ which is shunted by a bypass condenser $C_2$ provides bias for the valves $V_1$, $V_2$. If desired, further cathode follower stages may be used, and any stage may consist of one, two, or more valves in parallel as may be necessary.

The cathode follower stage or stages can be fed with alternating voltage as before; this voltage must be nearly in quadrature of phase with the voltage applied on the grids of the pentodes $P_1$ and $P_2$.

With the circuit so far described very short rectangular impulses of high voltage are produced; and the power is also high because the output circuit presents a low impedance. The output is applied over a coupling condenser $C_3$ to the grid of an impulse generator valve $V_3$ connected in a known manner to produce very high peak voltages at high power for very short periods. At each impulse applied to the grid of the valve, the plate current increases rapidly and after attaining a peak value is sharply cut off. The energy accumulated in the inductance L is then discharged in the circuit formed by the residual capacity CR. Impulses having a wave form as shown in Fig. 4 and having very high voltages and peak power outputs are developed across the load resistance LR.

What is claimed is:

1. A system for producing high voltage impulses having a duration short compared with their period of repetition, comprising a source of sinusoidal waves, a pair of electron discharge valves each having a cathode, a control electrode, and an anode, means for applying said sinusoidal waves to the respective control electrodes with a phase difference slightly displaced from exact phase opposition, a parallel connection for said anodes, and a source of alternating high-tension voltage connected to said anodes of such periodicity and phase that it is in phase quadrature with the sinusoidal waves applied to said control electrodes.

2. A system according to claim 1 further comprising resistances inserted in the conductors of each said control electrode for limiting the positive voltages applied thereto and diodes connected between each control electrode and a point of stable potential for limiting the negative voltages applied to said control electrodes.

3. A system for producing high voltage impulses having a duration short compared with their period of repetition comprising a source of rectangular impulses, a multi-stage amplifier including a first stage comprising an electron discharge device having a cathode, a control grid and an anode and connected as a voltage amplifier, a subsequent stage comprising an electron discharge device having a cathode, a control grid and an anode connected as a power amplifier of the cathode follower type, means for applying said source of rectangular impulses to said control electrode of the electron discharge device comprising said first stage, and a source of alternating high tension voltage connected to the anodes of both said discharge devices of such periodicity and phase that the voltage applied to said anodes is a minimum during periods between the impulses applied to said control electrode of the discharge device comprising said first stage.

4. A system according to claim 3 wherein the periodicity of said source of alternating high-tension voltage is integrally related to the periodicity of said source of rectangular impulses.

MAURICE MOÏSE LÉVY.

REFERENCES CITED

The following references are of record in the file of this patent:

UNITED STATES PATENTS

| Number | Name | Date |
|---|---|---|
| 1,926,749 | Mages | Sept. 12, 1933 |
| 2,190,504 | Schlesinger | Feb. 13, 1940 |
| 2,226,459 | Bingley | Dec. 24, 1940 |
| 2,141,937 | Schroter | Dec. 27, 1938 |
| 2,307,799 | Koch | Apr. 21, 1936 |
| 2,361,172 | Brown | Oct. 24, 1944 |
| 2,401,424 | Hershberger | June 4, 1946 |
| 2,408,061 | Grieg | Sept. 24, 1946 |

FOREIGN PATENTS

| Number | Country | Date |
|---|---|---|
| 456,450 | Great Britain | Nov. 3, 1936 |
| 485,989 | Great Britain | May 23, 1938 |